United States Patent [19]
Moreau

[11] Patent Number: 5,230,299
[45] Date of Patent: Jul. 27, 1993

[54] TELESCOPING ENTRY GATE FOR MILKING PARLOR

[75] Inventor: Joseph R. Moreau, New Hartford, N.Y.

[73] Assignee: Norbco Inc., Westmoreland, N.Y.

[21] Appl. No.: 922,237

[22] Filed: Jul. 31, 1992

[51] Int. Cl.⁵ .............................................. A01K 1/12
[52] U.S. Cl. ................................................ 119/14.03
[58] Field of Search .................... 119/14.03, 27, 155

[56] References Cited

U.S. PATENT DOCUMENTS

| | | | |
|---|---|---|---|
| 1,079,166 | 11/1913 | Cramer | 119/27 |
| 3,536,045 | 10/1970 | Flocchini | 119/27 |
| 4,217,860 | 8/1980 | Gloggler | 119/27 |

Primary Examiner—Robert P. Swiatek
Attorney, Agent, or Firm—Wall and Roehrig

[57] ABSTRACT

A telescoping entry gate for a milking parlor has a pair of horizontal slide tubes supported on a vertical support embedded in the cow stand. A U-shaped gate member has upper and lower legs slidably journalled in the slide tubes. A pneumatic actuator coupled to the vertical support and to the distal end of the sliding gate member moves the gate between an extended or closed position and a retracted or open position. A barrier in line with the gate defines a cow-passage of about thirty-two inches clearance in the open position and a man-passage of about twelve inches clearance in the closed position.

9 Claims, 4 Drawing Sheets

TELESCOPING ENTRY GATE FOR MILKING PARLOR

BACKGROUND OF THE INVENTION

The present invention relates in general to cattle stalls, e.g., milking parlors, and is more particularly directed to an entry gate which opens to admit cows into the milking parlor, and then closes behind them.

A milking parlor generally consists of an array of individual stalls, each designed to hold an individual cow as she is being milked. The cows are walked into the parlor through an entry gate and then each cow is directed to her respective stall. There an attendant washes her udder, attaches a milking unit, monitors and attends to the milking operation, disconnects the milking unit, and releases the cows so another group of cows can be milked. There are various schemes for milking parlors, including diagonal or herringbone, and parallel or side-by-side. The cows exit either in gang fashion, in which an entire wall of the milking parlor is lifted away, or serially through an exit gate.

The typical parlor has a swing-type entry gate that entirely closes behind the last cow into the milking parlor.

It is desirable for the entry gate to occupy as little floor area as possible, and to be made with as few moving parts as possible. It is also desired to include means to urge the cow into the stall without injuring her. If possible, means should be provided for a human attendant to enter the parlor without having to open or release the gate or gates. However, to date no entry gate has incorporated all of the above features.

OBJECTS AND SUMMARY OF THE INVENTION

It is an object of this invention to provide a milking parlor entry gate that avoids the drawbacks of the prior art, and which controllably telescopes between an open position, in which cows can pass into the parlor, and a closed position which provides a manpassage too narrow for cow passage but of sufficient width for a human attendant.

It is another object to provide a telescoping entry gate of simple construction, which is reliable and safe.

According to an aspect of this invention, a telescoping entry gate has upper and lower parallel horizontal tubes or sleeves that are supported on one or more vertical support members affixed relative to the floor of the parlor. A generally U-shaped gate member includes upper and lower parallel horizontal legs that are slidably supported on sliding bearings in the outer tubes, and a distal vertical member that connects the distal ends of the upper and lower parallel members. A pneumatic cylinder or equivalent linear actuator is mounted at one end to one of the vertical support members and at its other end to the vertical distal member of the gate member. The actuator is operative for moving the gate member between a retracted or open position and an extended or closed position. A barrier member is positioned generally in line with the gate member and distally beyond the position of the gate distal member when the gate is in its extended position. In this position the barrier and the gate member define a clearance on the order of about one foot, which is sufficient for man passage but too narrow for cow passage. In the open position the gate member and barrier have a clearance of about two-and-a-half to three feet, which is sufficient for cow passage. In a preferred mode, the open clearance is thirty-two inches, and the closed clearance is twelve inches, which limits the actuator stroke to twenty inches.

In the milking parlor, the gate is installed to traverse the cow entry path at a small angle, i.e., fifteen degrees, so that a cow entering the final stall position (i.e., adjacent the entry gate) is gently urged into the parlor by closing action of the gate member.

The above and many other objects, features, and advantages of this invention will become apparent from the ensuing description of one preferred embodiment, to be read in conjunction with the accompanying Drawing:

DETAILED DESCRIPTION OF THE PREFERRED EMBODIMENT

Figure 1:
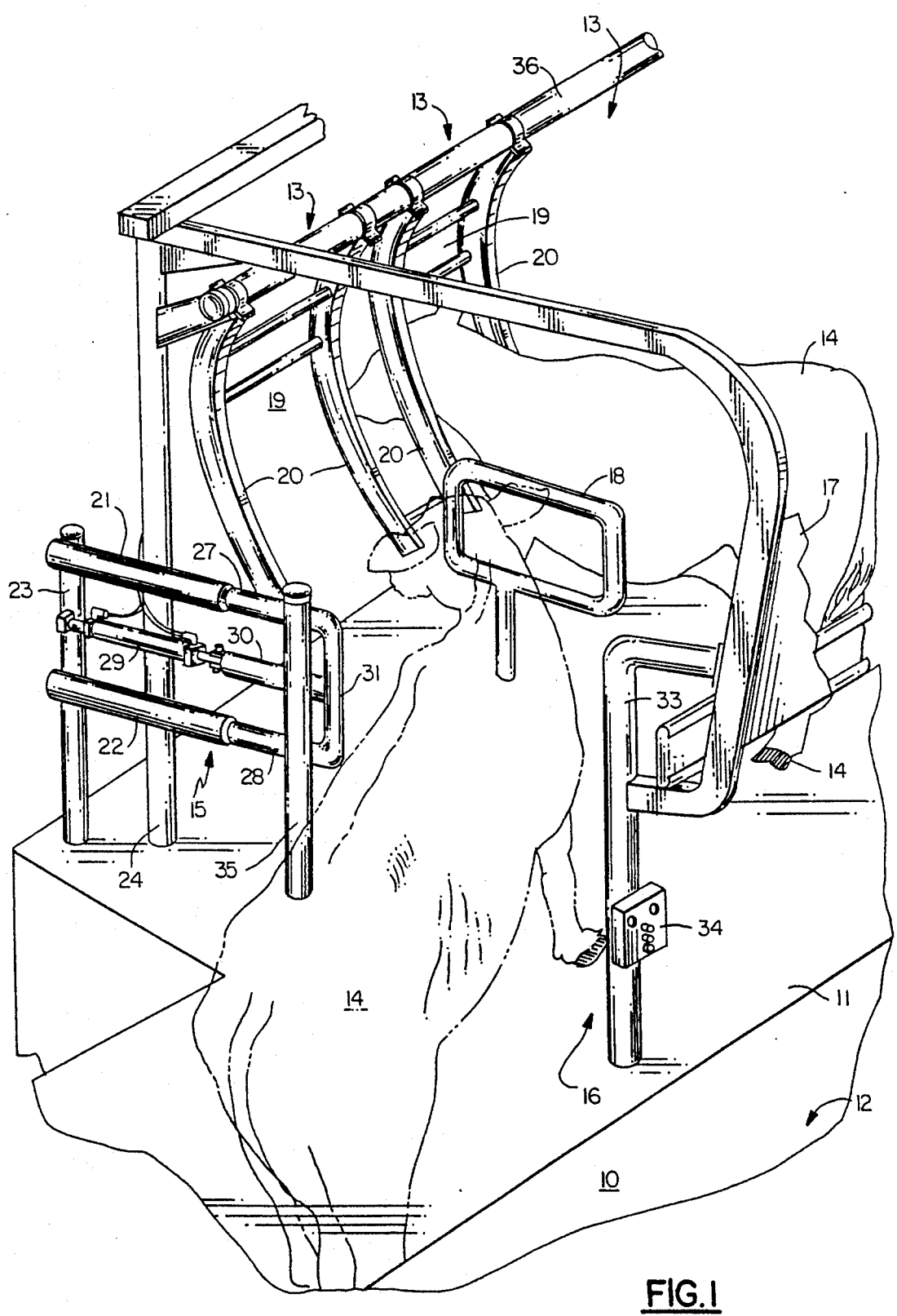
FIG. 1 is a perspective view of a milking parlor which features the telescoping entry gate according to one preferred embodiment of the invention.

With reference to the Drawing, and initially to FIG. 1, a milking parlor 10 is shown in which there is a platform or cow stand 11 with a milker operator pit 12, in the foreground and to the right in this view. The parlor is arranged into a series of parallel or side-by-side milking stalls 13. In this arrangement, cows 14 enter from a holding pen (not shown) and proceed through an entry gate 15 into an entry lane or passage 16 that traverses the back ends of the milking stalls 13. The lane is defined on one side by a rear shield 17 and on the other side by a series of cow-operated sequencing swing gates 18.

These gates 18 form part of the side walls of the milking stalls after the cow has entered and turned the associated gate. When the stall is unoccupied, the gate 18 swings to a closed position, parallel to the rear shield 17, to close off the stall so that a cow entering the parlor will proceed down the entry lane to the last unoccupied stall. When the cow enters the stall 13 she pushes the sequencing gate 18 to its open position, generally perpendicular to the rear shield 17. This opens the next stall in sequence for the following cow to enter.

In this parlor there are exit gates 19 for each stall 13, with the exit gates 19 each comprising a pair of parallel swing arms 20 pivoted about an overhead pivot rail 36. The exit gates are normally in a descended position, as shown, and each cow inserts her head between the swing arms 20 as she enters the stall. In a preferred version, the swing arms are movable after entry of the cow 14 to permit so-called indexing, i.e, pushing the cow back gently to the rear shield 17 to facilitate milking. Indexing can be carried out either for each individual cow or for an entire group or gang of cows.

The entry gate 15 has an upper tubular slide member 21 and a lower tubular slide member 22 situated horizontally and supported on a proximal or front vertical post 23 and on an additional vertical support member 24. The latter can, for example, be a part of the overall frame of the milking parlor. The vertical post 23 and support member 24 are embedded into the floor of the cow stand 11. However, in other versions they may be supported from overhead members.

A generally U-shaped or E-shaped sliding gate member 26 has upper and lower legs 27 and 28 that travel slidably in the respective tubular slide members 21 and 22. An air cylinder 29 or equivalent linear actuator is mounted at one end to the vertical post 23 and at its other end, i.e., its rod end, to an additional tube 30 that is connected to a vertical distal bar 31 that joins the upper and lower legs 27, 28.

Figure 2:
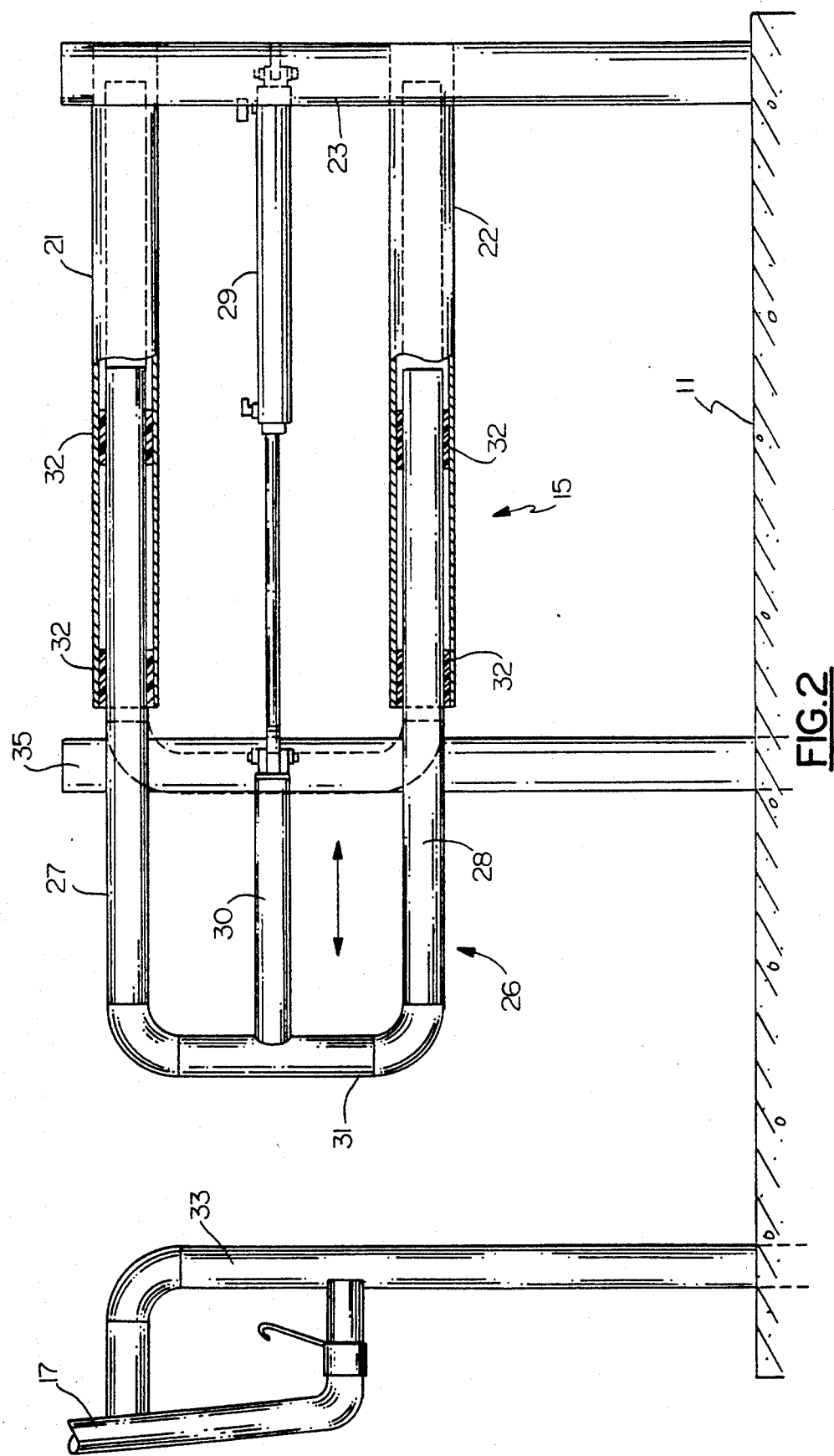
FIG. 2 is an elevation, partly in section, showing the telescoping gate mechanism of this embodiment.
Figure 3:
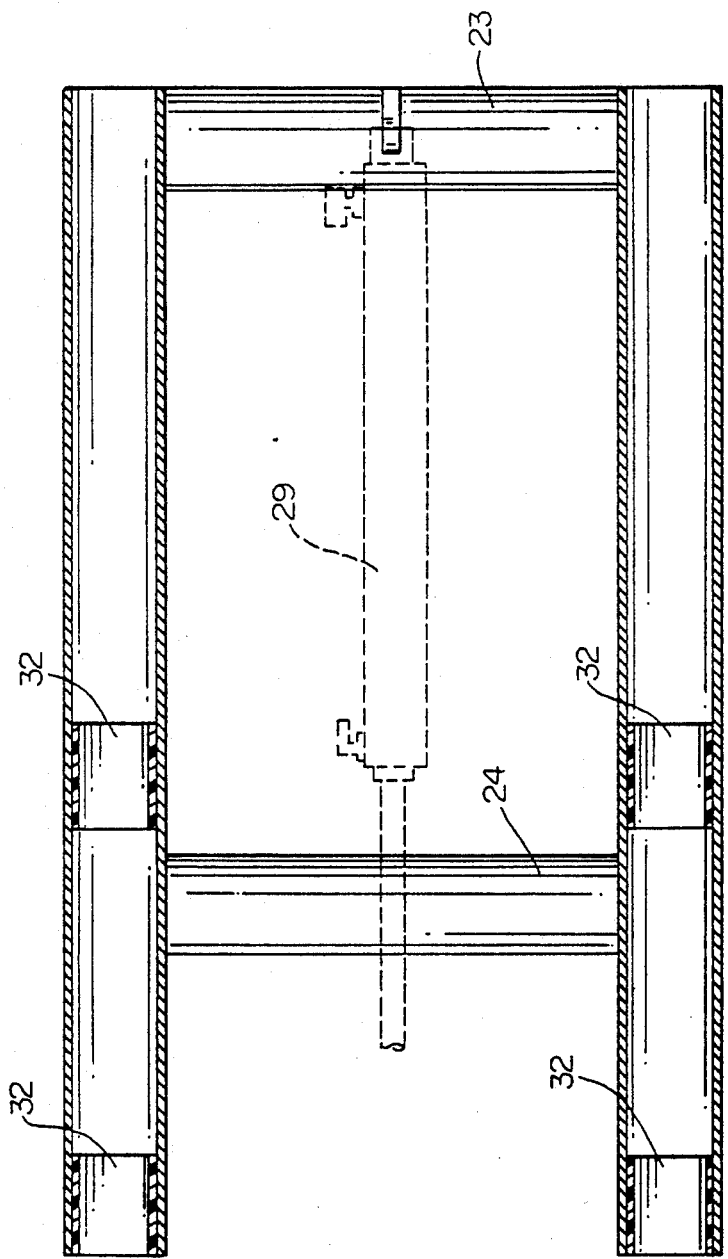
FIG. 3 is a sectional elevation of upper and lower outer guide tubes of the telescoping gate.

As shown in FIGS. 2 and 3, the outer tubular slide members 21 and 22 have tubular sliding bearings 32 press-fit therein at the distal end and a distance back therefrom for slidably supporting the respective legs 27 and 28. These can be a plastic material such as LDPE, and can include a lubricant agent incorporated into the material.

Positioned in line with the gate 15 and spaced from the distal bar 31 when the gate is extended, is a barrier member 33. Here, the barrier member 33 is a tubular vertical member embedded in the cow stand 11 and also supporting the rear shield 17. This barrier member 33 together with the sliding gate member 26 define a cow passage to permit the cows to enter the parlor. When the cylinder is retracted, the gate 26 is withdrawn to the ghost line position as shown in FIG. 2, where there is a clearance between the vertical distal bar 31 and the barrier member 33 of about thirty-two inches. This is sufficient width for the cows 14 to pass. However, when the cylinder 29 is actuated to its extended position, as shown in solid line in FIG. 2, there is a clearance of only about twelve inches between the vertical bar member 31 and the barrier member 33. This prevents cows from entering or exiting, but is wide enough for a human attendant to walk through. This feature avoids the unsafe practice of climbing over equipment when it is necessary to enter the parlor. A similar twelve-inch mangate can be provided at the far end of the parlor, but need not include a similar collapsible or telescoping gate.

Figure 4:
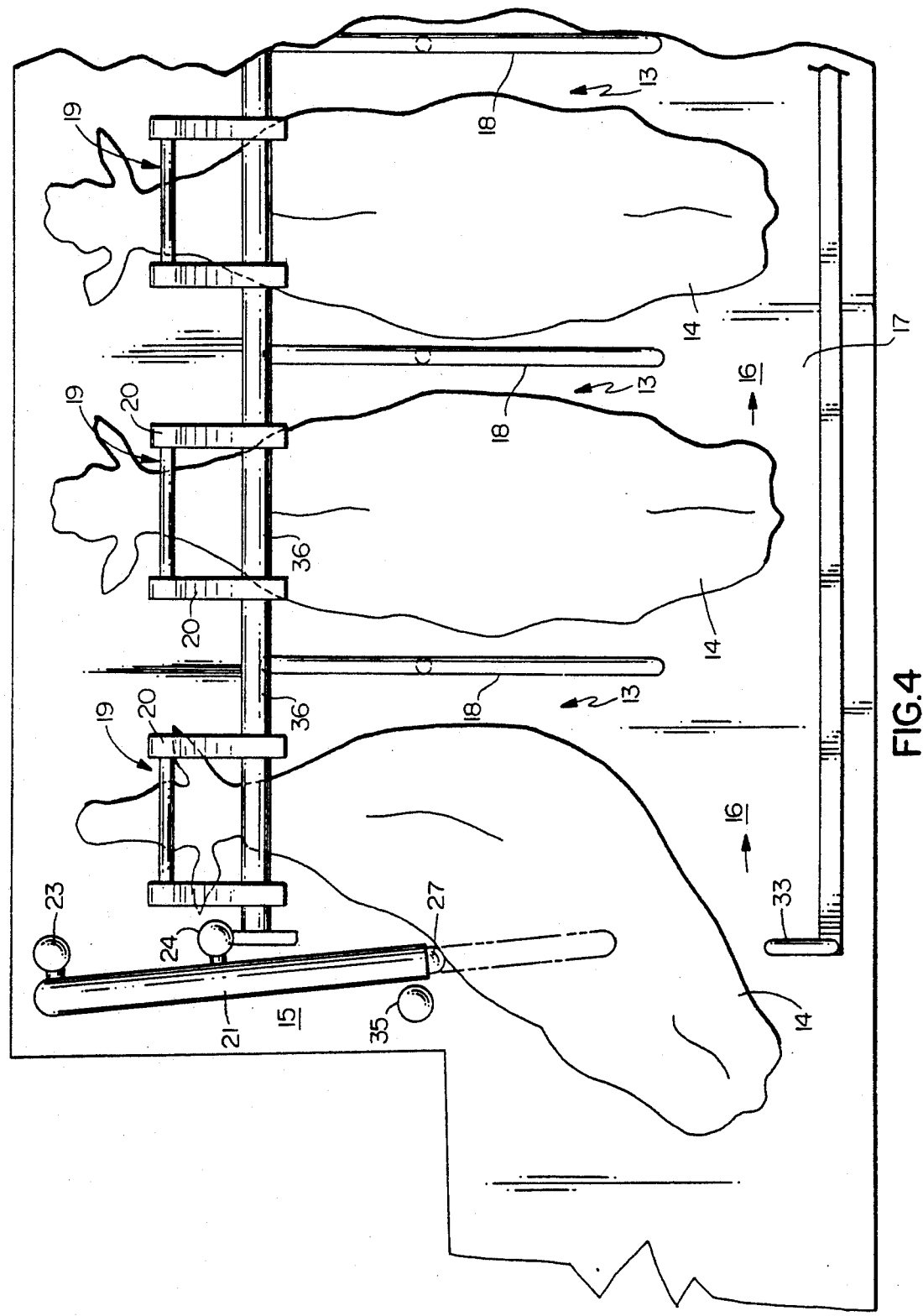
FIG. 4 is a plan view of one end of the milking parlor of FIG. 1 and also featuring the entry gate of this embodiment.

As shown in FIG. 4, the entry gate 15 is oriented at a small angle, e.g. fifteen degrees, across the lane or passage 16 at the entry to the milking parlor. This feature serves to position the gate 15 so that when it closes it will gently urge the final cow 14 into the stall 13 that is adjacent the entry gate. The air pressure to the cylinder is regulated, and the air flow rate controlled so that the gate member 26 gently applies pressure against the cow, urging her into the stall.

A control panel 34 is positioned in the operator pit 12 to control air fed to the cylinder 29, thus to control opening and closing of the entry gate. Additional push button controls on the panel 34 control lifting and indexing functions of the exit gates 19.

In this embodiment an additional vertical post 35 is positioned rising from the cow stand 11 even with the vertical distal bar 31 of the gate member 26 when in the open position, and just outside the gate, i.e., on the entry side.

Also shown but not described in detail are various structural components of the milking parlor, as the functions of these components are well known. However, the milking parlor as shown here is intended as an environment for the entry gate 15, and can be of any well-known design.

Also, the entry gate is not limited to parallel type parlors alone, but can be employed with diagonal or herringbone parlors or with parlors employing a serial exit feature.

The invention has been described in detail with reference to on preferred embodiment. However the invention is not limited to that precise embodiment. Rather, many modifications and variations will present themselves to those of skill in the art without departing from the scope and spirit of this invention, as defined in the appended claims.

What is claimed is:

1. Telescoping entry gate for a milking parlor comprising a vertical support member, upper and lower parallel horizontal tubular slides supported on said vertical support member, a generally U-shaped gate member that includes upper and lower parallel horizontal members slidably supported in said upper and lower tubular slides, and a vertical distal member connecting said upper and lower parallel members; linear actuator means mounted at one end to said vertical support member and affixed at its other end relative to the vertical distal member of said gate member, and operative for moving said gate member between a retracted open position and an extended, closed position; and a vertical barrier member positioned substantially in line with said gate member and spaced therefrom such that in the open position there is a clearance on the order of about two and a half feet or more sufficient for cow passage, while in the extended, closed position there is a clearance on the order of about one foot sufficient for man passage but too narrow for cow passage.

2. Telescoping entry gate according to claim 1 wherein said upper and lower horizontal members are elongated tubular members.

3. Telescoping entry gate according to claim 2 further comprising tubular linear bearings disposed within the upper and lower horizontal tubular slides and through which said elongated tubular members slide.

4. Telescoping entry gate according to claim 1, further comprising an additional vertical support member mounting said tubular slides at a position distally of the first mentioned vertical support member.

5. Telescoping entry gate according to claim 1, further comprising an additional horizontal member affixed to said vertical distal member and attached to an operating member of said linear actuator means.

6. Telescoping entry gate according to claim 1 wherein said gate is arranged to traverse an entry path for cows into said parlor at a positive angle such that a cow at a stall position adjacent said gate is gently urged into the parlor when the gate closes.

7. Telescoping entry gate according to claim 6 wherein said angle is on the order of fifteen degrees.

8. Telescoping entry gate according to claim 7 wherein said parlor is a parallel stall arrangement which comprises a plurality of cow stalls situated side by side, and said entry path crosses rear ends of said stalls.

9. Telescoping entry gate according to claim 8 wherein said gate is oriented with its distal side directed generally towards the rear ends of said stalls.

* * * * *